(12) United States Patent
Sablone et al.

(10) Patent No.: US 12,036,721 B2
(45) Date of Patent: Jul. 16, 2024

(54) UNIT FOR TRANSVERSELY STRETCHING ELASTIC FILMS

(71) Applicant: Fameccanica.Data S.p.A., San Giovanni Teatino (IT)

(72) Inventors: Gabriele Sablone, San Giovanni Teatino (IT); Antonio D'Alberto, San Giovanni Teatino (IT)

(73) Assignee: Fameccanica.Data S.p.A., San Giovanni Teatino Chieti (IT)

( * ) Notice: Subject to any disclaimer, the term of this patent is extended or adjusted under 35 U.S.C. 154(b) by 0 days.

(21) Appl. No.: 17/879,828

(22) Filed: Aug. 3, 2022

(65) Prior Publication Data
US 2023/0040431 A1 Feb. 9, 2023

(30) Foreign Application Priority Data

Aug. 5, 2021 (EP) ..................................... 21189781

(51) Int. Cl.
*B29C 55/08* (2006.01)
*B29L 7/00* (2006.01)

(52) U.S. Cl.
CPC ...... *B29C 55/08* (2013.01); *B29K 2995/0046* (2013.01); *B29L 2007/008* (2013.01)

(58) Field of Classification Search
CPC ................................ B29C 55/08; B29C 55/20
See application file for complete search history.

(56) References Cited

U.S. PATENT DOCUMENTS

| | | | | |
|---|---|---|---|---|
| 5,308,345 | A | * | 5/1994 | Herrin ................. B29C 66/4722 604/385.27 |
| 2012/0073729 | A1 | * | 3/2012 | Giuliani .................. B29C 55/08 156/163 |
| 2018/0042778 | A1 | * | 2/2018 | Lenser ................ B32B 37/1018 |

FOREIGN PATENT DOCUMENTS

EP 2260813 A1 12/2010

OTHER PUBLICATIONS

European Search Report dated Dec. 31, 2021. 6 pages.

* cited by examiner

*Primary Examiner* — Nahida Sultana
*Assistant Examiner* — Virak Nguon
(74) *Attorney, Agent, or Firm* — RMCK Law Group PLC (57) ABSTRACT

A stretching unit for transversely stretching elastic films, including first and second stretching devices each having respective gripping zones and respective release zones, and wherein the release zones of the first and second stretching devices are aligned to each other along a common transverse release line.

12 Claims, 7 Drawing Sheets fig.1 fig.2 fig.3 fig.4 fig.6 fig.7 fig.8 fig.9 fig.10

UNIT FOR TRANSVERSELY STRETCHING ELASTIC FILMS

CROSS-REFERENCE TO RELATED APPLICATION

This application claims priority to European Patent Application No. 21189781.4 filed Aug. 5, 2021. The disclosure of the above application is incorporated herein by reference in its entirety.

FIELD OF THE INVENTION

The present invention relates to the production of elastic laminates.

The invention has been developed with particular regard to the production of elastic laminates intended to be used for manufacturing sanitary articles such as absorbent sanitary articles, elastic bands for dressings, etc.

More specifically, the invention relates to a unit for transversely stretching at least one elastic film to be sandwiched between two nonwoven webs.

DESCRIPTION OF THE PRIOR ART

For producing sanitary articles, such as diapers and other absorbent articles, components with different properties are assembled together, such as absorbent cores, backsheets, topsheets, elastic waist bands, elastic side panels, closing formations, elastic barriers for the legs (leg cuffs), etc.

Some components of absorbent sanitary articles, such as elastic bands for the legs, elastic leg barriers, elastic side panels, elastic waist bands, etc., are made from elastic laminates.

Elastic laminates can be produced in various ways depending on the characteristics of the absorbent sanitary articles. For example, some types of elastic laminates may be formed from one or more nonwoven webs bonded to an elastic film. In certain applications, the elastic film is stretched in a transverse direction before being fixed between two opposite nonwoven webs.

EP3496687 A1 describes a method and apparatus for assembling elastic laminates, wherein a first nonwoven web is wound on an outer cylindrical surface of an anvil wheel rotating around an axis of rotation, first and second elastic films are stretched in a transverse direction on first and second stretching devices and are applied on the first nonwoven web on the anvil wheel in first and second application zones displaced axially and angularly relative to each other with respect to the axis of rotation, a second nonwoven web is fed to the anvil wheel above the first and second elastic films stretched in the transverse direction, and the first and second nonwoven webs are welded together ultrasonically through the first and second elastic films and in a central portion comprised between the first and second elastic films.

Other similar solutions are disclosed in EP3496688, EP3496689, EP3496690.

In the solution described in EP3496687 A1, the first and second elastic films stretched in the transverse direction are applied to the nonwoven web in two areas that are angularly offset from each other. This causes difficulties in positioning the elastic films with respect to the nonwoven web and involves problems in ensuring a precise spacing between the two elastic films. Also, arranging two stretching units in two distinct areas involves large dimensions of the manufacturing line, which may not be compatible with the dimensions of the manufacturing plant.

Prior art stretching devices are typically construed as shown in FIG. 2 of EP2260813 B1, wherein a pair of stretching members rotating about respective axes of rotation inclined with respect to each other are driven by respective motors, which protrude on opposite sides with respect to a central plane extending between the two stretching members. This arrangement requires the operators to carry out setting and adjustments operations on both sides of the unit. These operations are often intrinsically connected, so that often it is necessary to carry out settings or adjustments on one side following a setting or adjustment on the other side of the unit.

Another problem of the prior art apparatus for producing elastic laminates is the poor flexibility. The presently existing stretching units form a single type of elastic laminates. If the manufacturer intends to broaden the range of products, normally a manufacturing line should be installed for each type of product to be commercialized.

OBJECT AND SUMMARY OF THE INVENTION

The present invention aims to provide a stretching unit that overcome the problems of the prior art.

According to the present invention, this object is achieved by a stretching unit according to claim 1.

Optional features of the invention form the subject of the dependent claims.

The claims are an integral part of the disclosure submitted in relation to the invention.

BRIEF DESCRIPTION OF THE DRAWINGS

The present invention will now be described in detail with reference to the attached drawings, given purely by way of non-limiting example, wherein.

It will be appreciated that in the drawings some components may not be illustrated to simplify the understanding of the figures, and that various figures may not be represented on the same scale.

DETAILED DESCRIPTION

Figure 1:
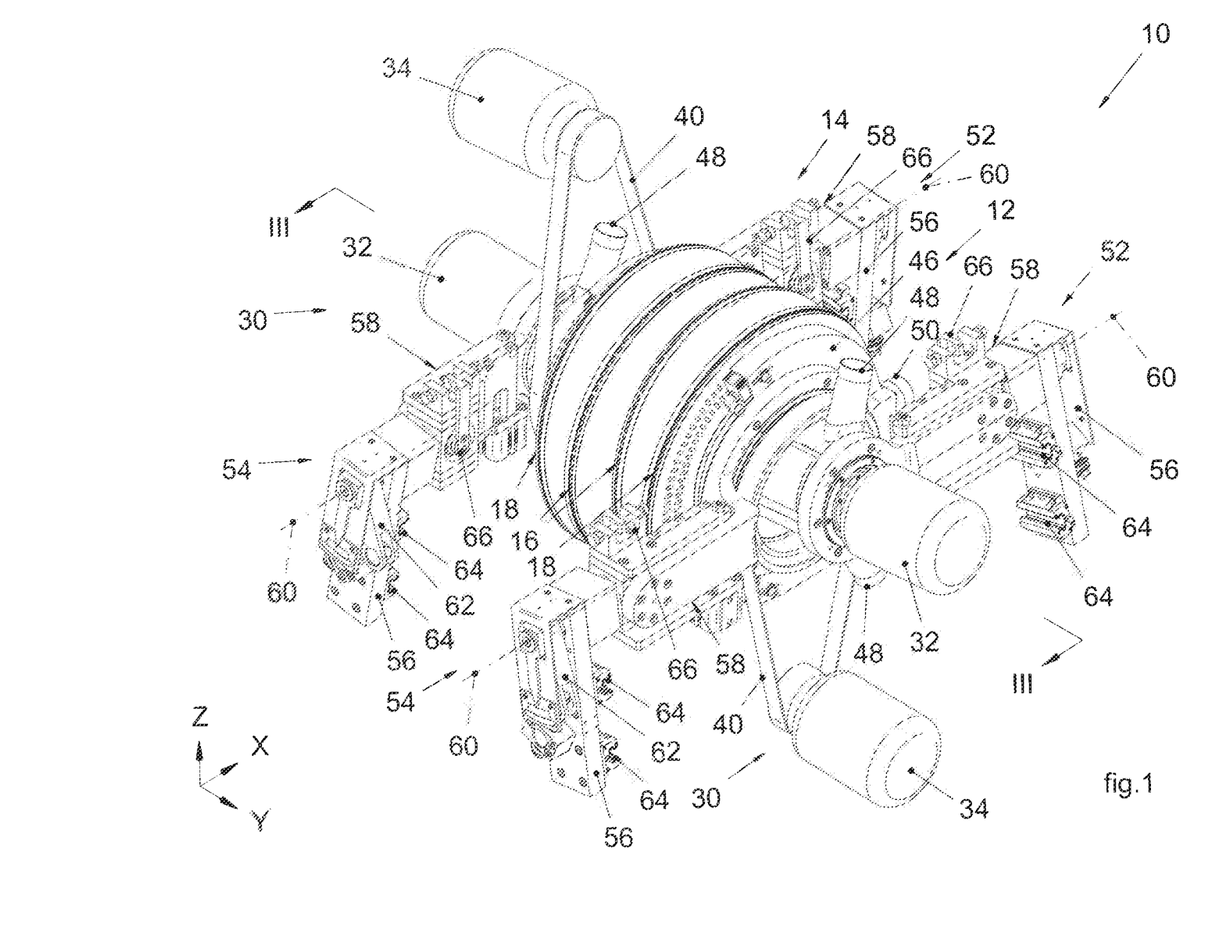
FIG. 1 is a schematic perspective view of a stretching unit.
Figure 2:
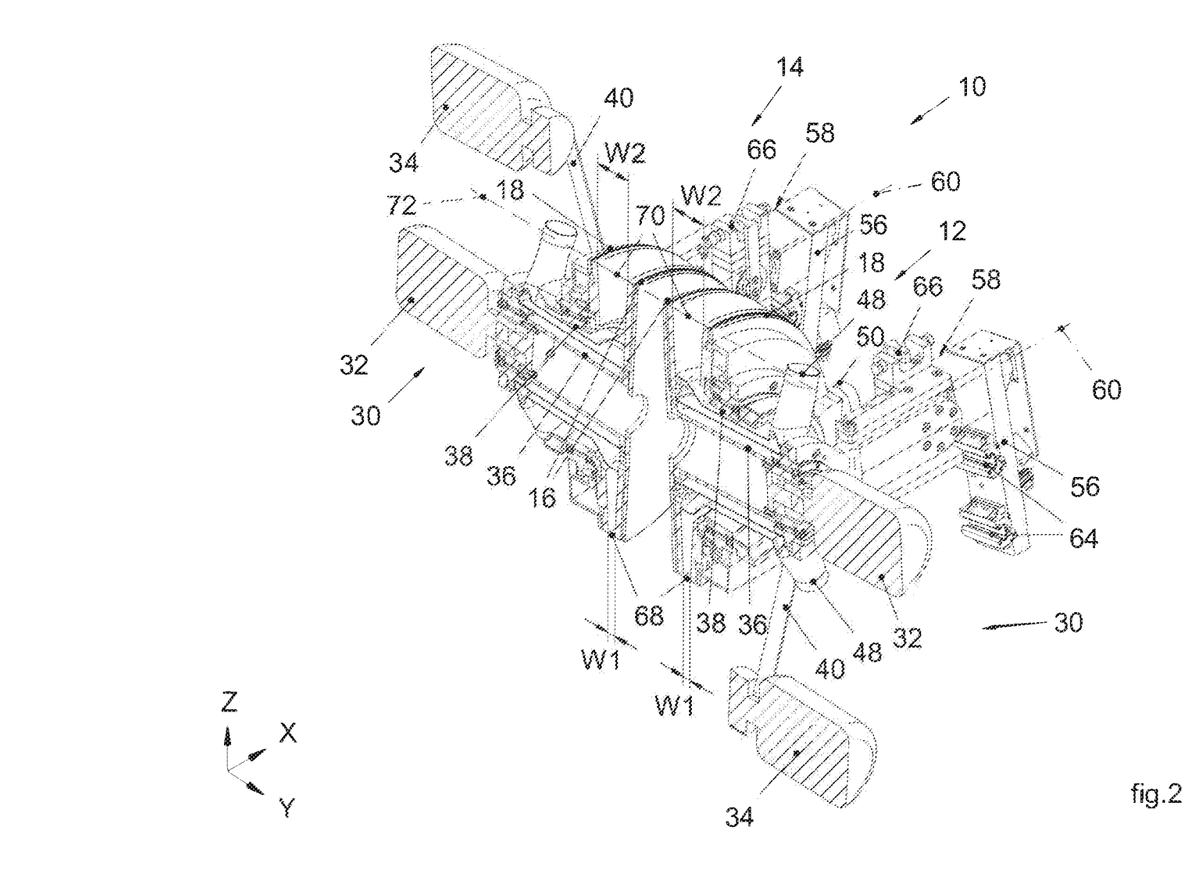
FIG. 2, is a partially sectioned perspective view of the stretching unit of claim 1.
Figure 3:
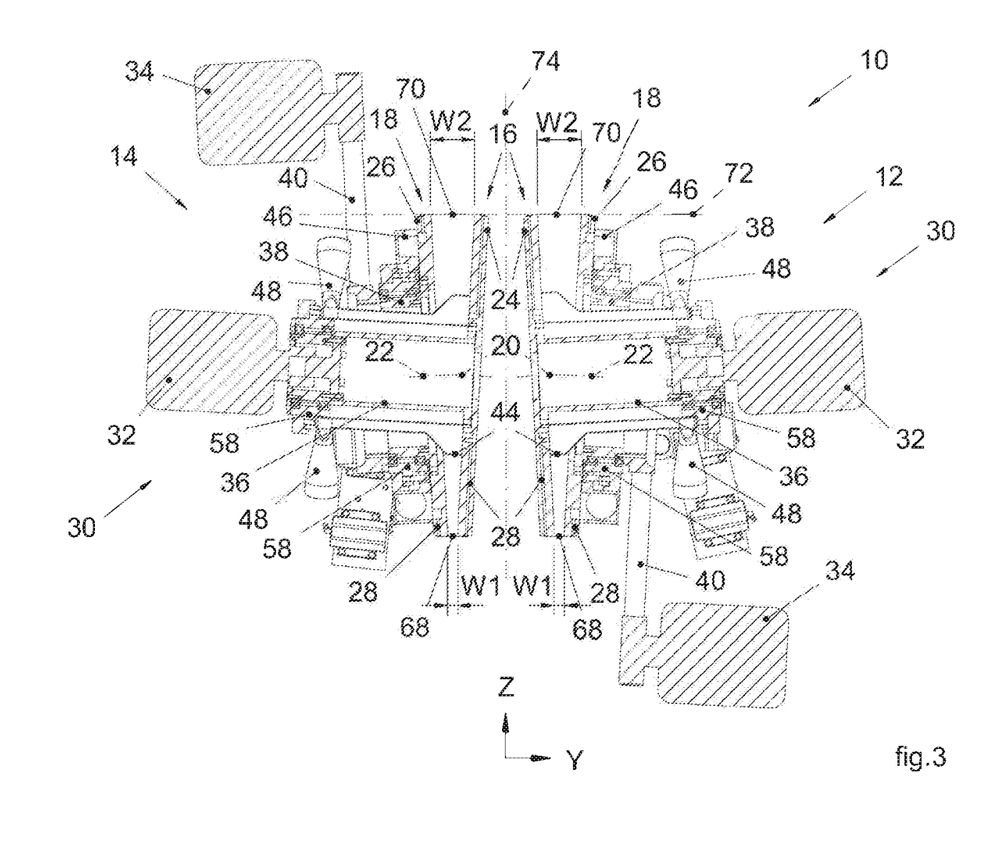
FIG. 3 is a cross-section taken along the line III-III of FIG. 1.

With reference to FIG. 1-3, numeral 10 indicates a stretching unit for stretching continuous elastic films in a direction transversal to their longitudinal directions.

The stretching unit 10 comprises a first stretching device 12 and a second stretching device 14. The first and second stretching devices 12, 14 are substantially identical to each other.

Each of the first and second stretching devices 12, 14 comprises first and second stretching members 16, 18 rotating about respective first and second axes of rotation 20, 22 (FIG. 3) inclined with respect to each other.

The first and second stretching members 16, 18 may be disk-shaped, as shown in the drawings. In possible embodiments, the first and second stretching members 16, 18 may have a shape different from that of a disk.

The first and second stretching members 16, 18 have respective outer edges 24, 26 provided with gripping elements for gripping corresponding side edges of an elastic film. The gripping elements may be suction holes 28 open on the outer edges 24, 26 and connected to a sub-atmospheric pressure source, as it will be disclosed in the following. The outer edges 24, 26 of the stretching members 16, 18 may be provided with protruding pins that engage the side edges of an elastic film, alternatively or in addition to the suction holes 28.

With reference to FIGS. 1-3, each of the first and second stretching devices 12, 14 comprises a respective driving assembly 30 configured for driving the respective first and second stretching members 16, 18 in rotation about the respective axes of rotation 20, 22.

The driving assembly 30 of each of the first and second stretching devices 12, 14 is arranged on only one side with respect to the respective stretching members 16, 18. More specifically, the first and second stretching members 16, 18 of each of the first and second stretching devices 12, 14 are respectively distal and proximal with respect to the respective driving assembly 30, and the driving assembly 30 extends on only one side with respect to the first stretching member 16.

In the embodiment shown in the figures, the driving assembly 34 of each of the first and second stretching devices 12, 14 comprises first and second motors 32, 34 which drive respectively the first and second stretching members 16, 18. Each motor 32, 34 may comprise a respective reduction gear. In each of the first and second stretching devices 12, 14 both motors 32, 34 are arranged on only one side with respect to the respective stretching members 16, 18.

In possible embodiments, the driving assembly 30 of each of the first and second stretching devices 12, 14 may comprise a single motor and a joint assembly which connects the single motor to the respective first and second stretching members 16, 18. In this embodiment, in of each of the first and second stretching devices 12, 14 the single motor and the joint assembly are arranged on only one side with respect to the respective stretching members 16, 18.

The first motor 32 may be coaxial to the respective first stretching member 16 and may be connected thereto via a first shaft 36. The second motor 34 may be eccentric to the respective second stretching member 18 and may be connected thereto by a second shaft 38 and by a belt transmission including a toothed belt 40 and a pair of toothed pulleys.

With reference to FIGS. 1-3, the suction holes 28 of each of the first and second stretching members 16, 18 communicate with a plurality of connection holes 42 open on side surfaces of the respective first and second stretching members 16, 18 facing the driving assembly 30. The connection holes 42 of each of the first and second stretching members 16, 18 are pneumatically connected to respective stationary suction chambers 44, 46 with open sides facing frontally the side surfaces of the respective first and second stretching members 16, 18 on which the connection holes 42 are open. The suction chambers 44, 46 are connected to a sub-atmospheric pressure source via respective tubular elements 48, 50 and flexible tubes (not shown). The suction chambers 44, 46 of each of the first and second stretching devices 12, 14 are arranged on the sides of the respective stretching members 16, 18 facing the respective driving assembly 30.

In a possible embodiment, the stationary suction chambers 44, 46 of each of the first and second stretching devices 12, 14 are coaxial to the respective first and second stretching members 16, 18.

In a possible embodiment, the suction chambers 44 of the first and second stretching devices 16, 18 connected to stretching members 16 which are distal with respect to the respective driving assembly 30 are selectively connectable and disconnectable from a sub-atmospheric pressure source, so that the stretching unit 10 may operate with only the outer stretching members 18 while the inner stretching members 16 are inoperative.

With reference to FIGS. 1-3, each of the of the first and second stretching devices 12, 14 comprises first and second adjustment mechanisms 52, 54 associated respectively to the first and second stretching members 16, 18.

Each of the of the first and second adjustment mechanisms 52, 54 is configured for adjusting the angle of inclination of the axis of rotation 20, 22 of the respective first and second stretching members 16, 18.

The first and second adjustment mechanisms 52, 54 of each of the first and second stretching devices 12, 14 are arranged on the side of the respective first and second stretching members 16, 18 facing the respective driving assembly 30.

With reference to FIGS. 1 and 2, each of the first and second adjustment mechanisms 52, 54 comprises a base 56 and an adjustable support structure 58. The angular position of the adjustable support structure 58 with respect to the base 56 can be adjusted about a respective adjustment axis 60. The angular movement of the adjustable support structure 58 about the adjustment axis 60 may be controlled by a manually actuated lever 62 or by a motor (not shown).

Each adjustable support structure 58 rotatably supports a respective first shaft 36 or second shaft 38. Therefore, an angular adjustment of the adjustable support structure 58 about the adjustment axis 60 changes the inclination of the respective first axis of rotation 20 or second axis of rotation 22.

The stationary suction chambers 44, 46 of each of the first and second stretching devices 12, 14 are supported by the adjustable support structure 58 of a respective first and second adjustment mechanism 52, 54. Therefore, when the inclination of the axes of rotation 20, 22 of the first and second stretching members 16, 18 is adjusted, the relative position between the first and second stretching members 16, 18 and the respective stationary suction chambers 44, 46 does not change.

The base 56 of each of the first and second adjustment mechanisms 52, 54 may comprise respective guides 64 which allow adjustment of the position of the respective first and second adjustment mechanisms 52, 54 along a transverse direction Y.

Each of the first and second adjustment mechanisms 52, 54 may comprise an auxiliary adjustment device 66 which allow adjustment of the position of the respective first and second stretching members 16, 18 along a linear direction X and/or Z orthogonal to the transverse direction Y. The auxiliary adjustment devices 66 may be controlled manually or by respective motors (not shown).

With reference to FIG. 3, each of the first and second stretching devices 12, 14 has a respective gripping zone 68 and a respective release zone 70.

The first and second stretching members 16, 18 of each of the first and second stretching devices 12, 14 are spaced from each other in the transverse direction Y by first distance W1 in the gripping zones 68 and by a second distance W2 greater than the first distance W1 in the release zones 70. The distances W1, W2 of the first and second stretching device 12, 14 may be equal to or different from each other.

With reference in particular to FIGS. 2 and 3, the release zones 70 of the first and second stretching devices 12, 14 are aligned to each other along a common transverse release line 72.

With reference to FIG. 3 the first and second stretching devices 12, 14 are set on opposite sides with respect to a central plane 74 orthogonal to the common transverse release line 74. The two first stretching members 16 of the first and second stretching devices 12, 14 which are distal with respect to the respective driving assemblies 30 face opposite sides of the central plane 74.

In each of the first and second stretching devices 12, 14 the respective driving assembly 30, stationary suction chambers 44, 46 and adjustment mechanisms 52, 54 extend on only one side of the central plane 74. The driving assembly 30, stationary suction chambers 44, 46 and adjustment mechanisms 52, 54 of the first and second stretching device 12, 14 extend on opposite sides of the central plane 74.

Figure 4:
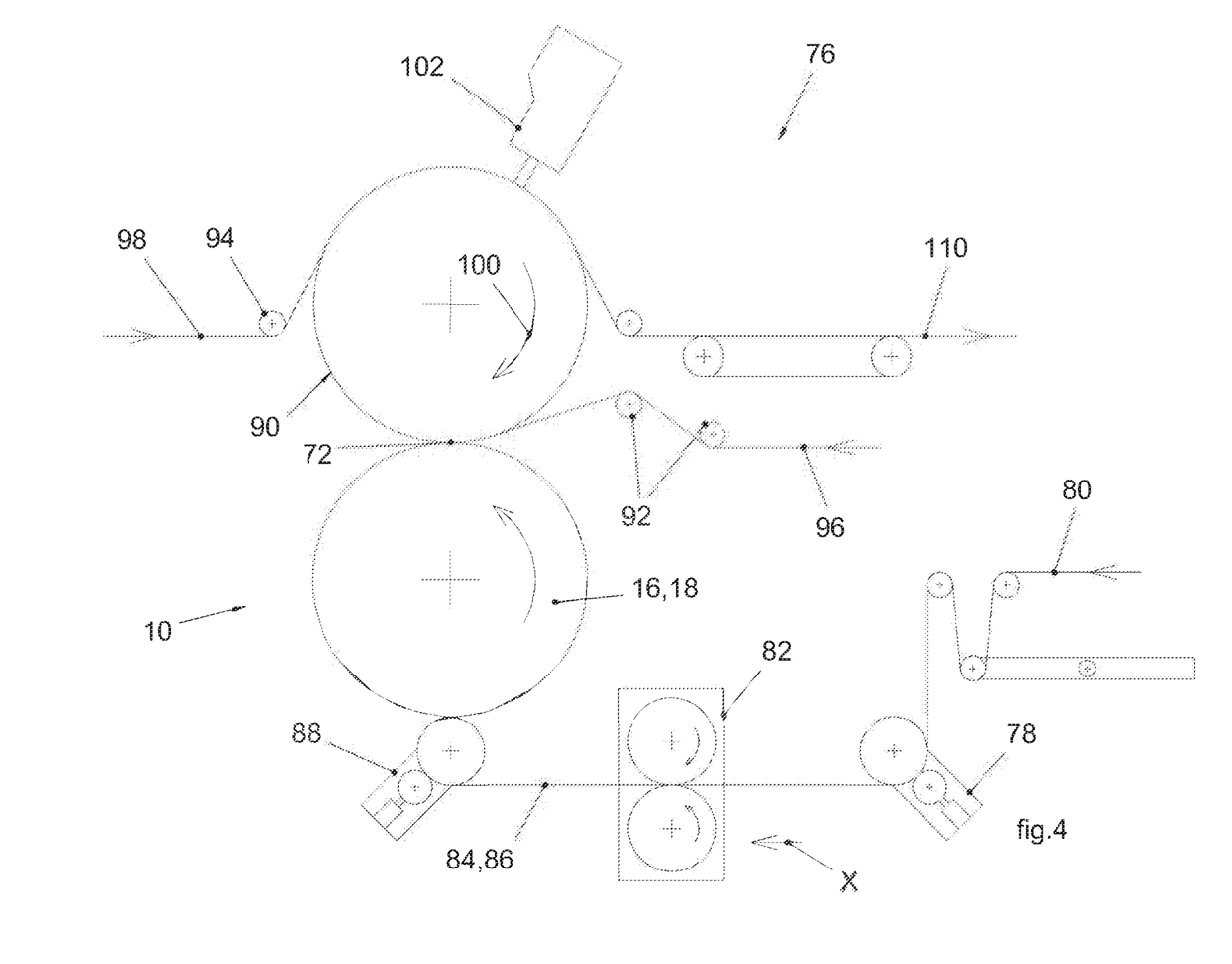
FIG. 4 is a schematic view of a first embodiment of an apparatus for producing elastic laminates.

With reference to FIG. 4, an apparatus for producing elastic laminates is indicated by the reference numeral 76.

The apparatus 76 comprises a first feeding device 78 configured to feed a single continuous elastic film 80 in a direction X parallel to its longitudinal axis.

The apparatus 10 comprises a stretching unit 10 as previously disclosed, including first and second stretching devices 12, 14.

The single continuous elastic film 80 is cut longitudinally in a longitudinal cutting unit 82 so as to form first and second continuous elastic films 84, 86 which are fed to the stretching unit 10 by a second feeding device 88.

Figure 5:
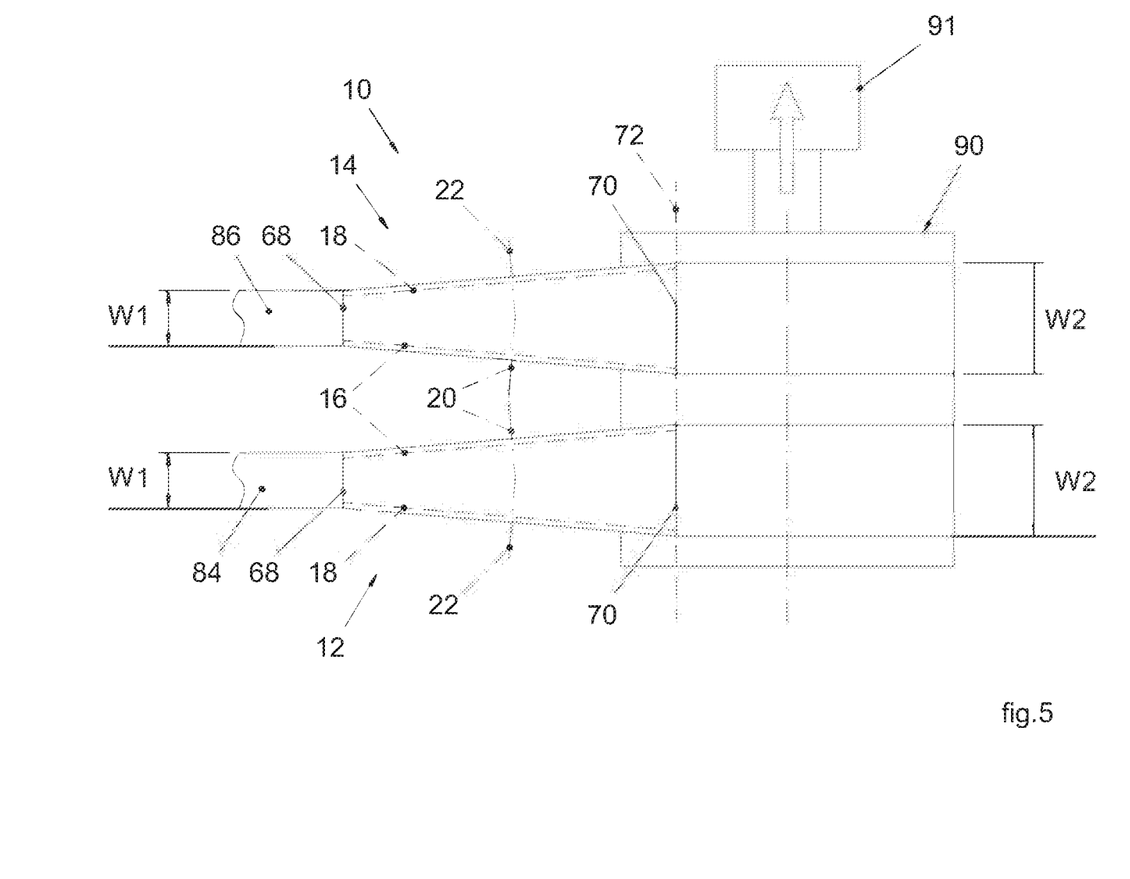
FIG. 5 is a schematic plan view showing the operation of the apparatus of FIG. 4.

The apparatus 10 comprises an anvil wheel 90 rotatable about a transverse axis of rotation. The anvil wheel 90 has an outer cylindrical surface provided with suction holes pneumatically connected to a source of sub-atmospheric pressure 91 (FIG. 5). The outer cylindrical surface of the anvil wheel 90 is tangent to the common transverse release line 72 of the stretching unit 10.

The apparatus 10 comprises a third feeding device 92 and a fourth feeding device 94 configured to feed to the anvil wheel 90 first and second nonwoven webs 96, 98, respectively. In a possible embodiment, each of the third feeding device and fourth feeding devices 94 may feed to the anvil wheel 90 two parallel first nonwoven webs 96 and two parallel second nonwoven webs 98.

The first nonwoven web 96 or the two parallel first nonwoven webs 96 is/are applied to the anvil wheel 50 upstream of the common transverse release line 72 of the stretching unit 10, and the second nonwoven web 98 or the two parallel second nonwoven webs 98 is/are applied to the anvil wheel 90 downstream of the common transverse release line 72, with reference to the direction of rotation of the anvil wheel 90 indicated by the arrow 100 in FIG. 4.

The apparatus 76 comprises a fastening device 102 cooperating with the outer cylindrical surface of the anvil wheel 90. The fastening device 102 may be an ultrasonic welding device, a pressure device for fastening by adhesive, or a thermal or thermomechanical welding device.

The operation of the apparatus 76 previously described is the following.

The single continuous elastic film 80 is unwound from a reel and is cut longitudinally to form first and second continuous elastic films 84, 86. The first and second continuous elastic films 84, 86 may have respective width W1 equal to or different from each other. In a possible embodiment, the first and second continuous elastic films 84, 86 may be unwound from respective reels. The first and second continuous elastic films 84, 86 may be equal or different from each other, e.g. they may be made of materials with different elastic properties.

With reference to FIG. 5, the lateral edges of the first and second continuous elastic films 84, 86 are gripped the outer edges 24, 26 of the respective first and second stretching devices 12, 14 of the stretching unit 10.

The first and second stretching devices 12, 14 pick-up the first and second continuous elastic films 84, 86 in the respective gripping zones 68 with respective first width W1 and rotate about the respective axes of rotation 20, 22. During the rotation of the stretching members 16, 18, the two continuous elastic films 84, 86 are stretched in a transverse direction Y in the path from the respective gripping zones 68 to the respective release zones 70. In the respective release zones 70 the two continuous elastic films 84, 86 have respective width W2, which may be equal to or different from each other.

With reference to FIG. 4, the first nonwoven web 96 or the two parallel first nonwoven webs 96 is/are applied to the outer cylindrical surface of the anvil wheel 90 at or upstream of the common transverse release line 72.

The first and second continuous elastic films 84, 86, while held stretched in the transverse direction Y, are detached from the outer edges 24, 26 of the respective first and second stretching members 14, 16 and are applied onto the first nonwoven web 96 or on respective parallel first nonwoven webs 96 held on the outer cylindrical surface of the anvil wheel 90 in the respective release zones 70, 76, aligned along the common transverse release line 72. The first and second continuous elastic films 84 86 are kept in a transversely stretched state on the outer cylindrical surface of the anvil wheel 90, e.g. by suction.

The fact of applying the first and second continuous elastic films 84, 86 on the first nonwoven web 96 or on respective parallel first nonwoven webs 96 along the common transverse release line 72 ensures a high accuracy of mutual positioning between the two continuous elastic films 84, 86 and the first nonwoven web(s) 96.

After applying the first and second continuous elastic films 84, 86 on the first nonwoven web 96 or on respective parallel first nonwoven webs 96 on the outer cylindrical surface of the anvil wheel 90, the second nonwoven web 98 or two parallel second nonwoven webs 98 is/are applied on the anvil wheel 90 above the two parallel continuous elastic films 84, 86 so that the elastic films 84, 86, elastically stretched in the transverse direction Y, are sandwiched between the first and the second nonwoven webs 96, 98 or between two pairs of first and the second nonwoven webs 96, 98.

Then, the nonwoven webs 96, 98 are joined together, for example by ultrasonic welding, through the two parallel continuous first and second elastic films 84, 86 by the fastening device 102, thereby forming a continuous elastic laminate 104 or two parallel continuous elastic laminates 104.

Joining to each other the nonwoven webs 96, 98 through the two parallel continuous elastic films 84, 86 includes both the direct fastening of the nonwoven webs 96, 98 through openings in the elastic films 84, 86, and fastening of the nonwoven webs 96, 98 on opposite sides of the elastic films 84, 86.

The fastening device 102 may be configured to form a plurality of connecting points that form respective holes passing through the elastic films 84 86, and that directly fix the opposite nonwoven webs 94, 96 to each other through the holes formed in the elastic films 84, 86. The elastic films 84, 86 remain anchored to the nonwoven webs 96, 98 at the connecting points that extend through the holes formed in the elastic films 84, 86. This provides breathable elastic laminates thanks to the formation of holes passing through the elastic films 84 86.

Figure 6:
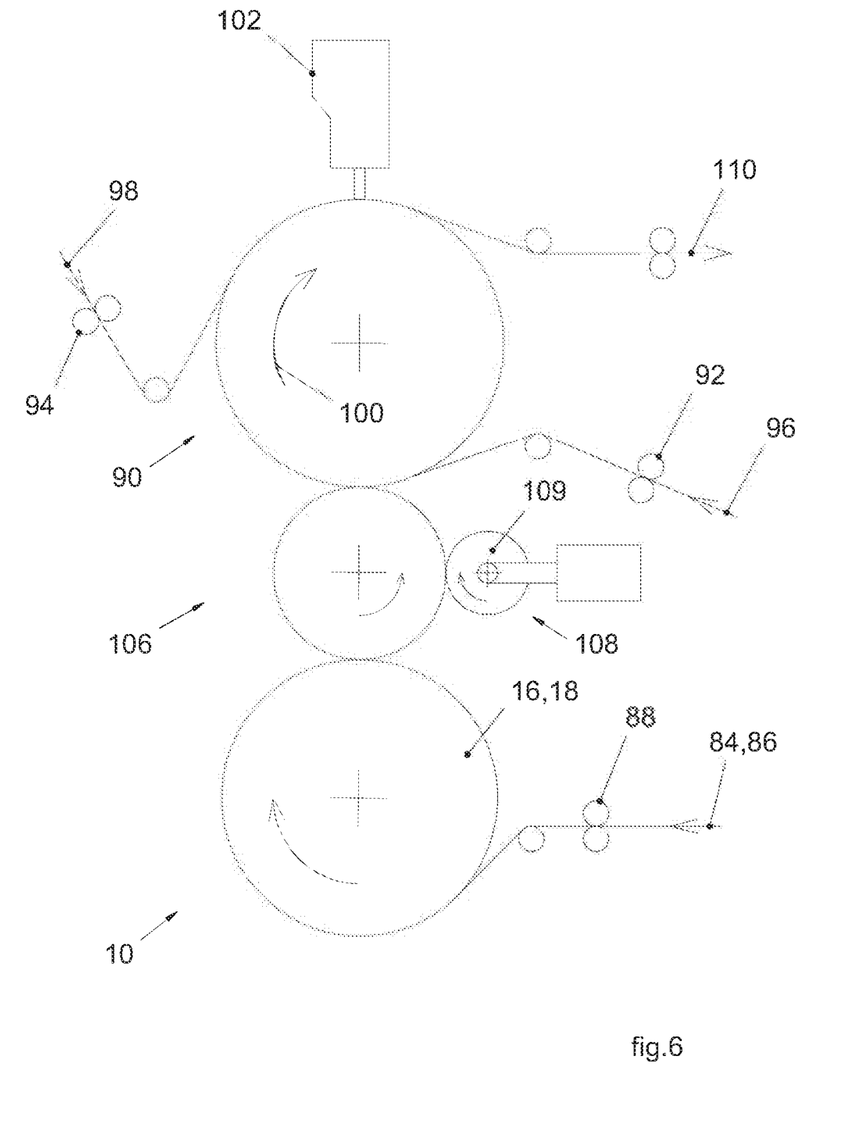
FIG. 6 is a schematic view of a second embodiment of an apparatus for producing elastic laminates.

FIG. 6 shows a second embodiment of an apparatus 76 for producing elastic laminates. The elements corresponding to those previously disclosed are indicated by the same reference numerals.

In the embodiment of FIG. 6 the apparatus 76 comprises a transfer wheel 106 arranged between the stretching unit 10 and the anvil wheel 90. The transfer wheel 106 rotates about an axis of rotation parallel to the axis of rotation of the anvil wheel 90 and has an outer cylindrical surface which is tangent to the outer cylindrical surface of the anvil wheel 90 along a transverse line.

The transfer wheel 106 is provided with gripping elements configured to hold the transversally stretched first and second continuous elastic films 84, 86. In a possible embodiment, the gripping elements may consist of suction holes open on the outer cylindrical surface of the transfer wheel 106 and pneumatically connected to a source of sub-atmospheric pressure, for retaining by suction the transversally stretched first and second continuous elastic films 84, 86. The gripping elements may comprise projecting pins, in addition or in alternative to suction holes.

The stretching unit 10 applies the transversally stretched first and second continuous elastic films 84, 86 on the outer cylindrical surface of the transfer wheel 106 in the release zones 70 aligned along the common transverse release line 72. In the release zones 70 the first and second continuous elastic films 84, 86 stretched in the transversal direction Y are detached from the first and second stretching members 16, 18 of the stretching unit 10 and are taken, e.g. by suction, on the outer cylindrical surface of the transfer wheel 106.

The first and second continuous elastic films 84, 86 stretched in the transversal direction Y are then detached from the transfer wheel 106 and are applied on the first nonwoven web 96 or on the two parallel first nonwoven webs 96 held on the outer cylindrical surface of the anvil wheel 90. In a possible embodiment, the first nonwoven web 96 or the two parallel first nonwoven webs 96 may be applied to the outer cylindrical surface of the anvil wheel 90 by first being applied to the transfer wheel 106, above the transversally stretched elastic films 84, 86.

In the embodiment of FIG. 6 the two parallel continuous elastic films 84, 86 (which are made of non-porous material) are applied directly in contact with the outer cylindrical surface of the transfer wheel 40 without the interposition of a layer of porous material. This allows retaining the continuous elastic films 84, 86 in a transversally stretched condition with high accuracy. Also, the two parallel continuous elastic films 84, 86 are transferred from the transfer wheel 106 to the anvil wheel 90 between two tangent cylindrical surfaces, which simplifies the transfer of the elastic films and avoids positioning errors that may occur when the elastic films are applied on nonwoven webs starting from surfaces with inclined axes.

With reference to FIG. 6, the apparatus 76 may comprise at least one longitudinal cutting device 108 configured to cut along at least one longitudinal cutting line the transversally stretched continuous elastic film 84, 86 held on the outer cylindrical surface of the transfer wheel 106.

In a possible embodiment, the stretching unit 10 may apply to the transfer wheel 106 a single continuous elastic film 80, which is cut longitudinally on the transfer wheel 106. The single continuous elastic film 80 may be cut longitudinally along a plurality of parallel cutting lines so as to form more than two parallel continuous elastic films.

The longitudinal cutting device 108 may comprise a cutting disk 109 rotating about an axis parallel to the axis of rotation of the transfer wheel 106. The cutting disk 109 may cooperate with a respective circumferential slot formed on the outer cylindrical surface of the transfer wheel 106.

In a possible embodiment, the apparatus may comprise a longitudinal cutting device arranged for carrying out the longitudinal cut of one or more continuous elastic films on the anvil wheel 90. The longitudinal cutting device may cut the elastic films without cutting the underneath nonwoven webs.

The apparatus according to the present invention has a great flexibility regarding the possibility to produce different types of elastic laminates.

Figure 7:
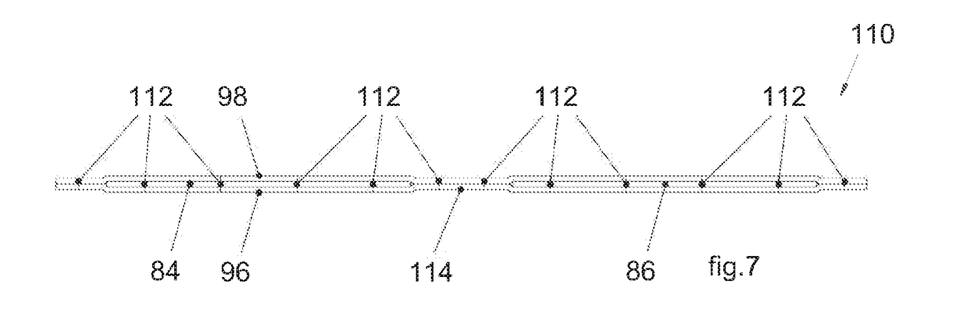
FIGS. 7, 8, 9, 10, are schematic cross-sections of different embodiments of elastic laminates which can be produced with the apparatus and methods disclosed herein.

With reference to FIG. 7 a first embodiment of an elastic laminate 110 comprises first and second continuous elastic films 84, 86 sandwiched between first and second wide nonwoven webs 96, 98 and fixed to the two nonwoven webs 96, 98 by a pattern of connecting points 112. The elastic laminate 110 may have a non-elastic portion 114 in which the elastic films 84 86 are transversely spaced apart from each other and the two nonwoven webs 96, 98 are directly in contact with each other. The two wide nonwoven webs 96, 98 are directly fixed to each other in the non-elastic portion 114 comprised between the two parallel continuous elastic films 84, 86, and along the longitudinal edges external to elastic films 84, 86. The fastening device 102 may be configured to carry out a uniform fastening pattern over the entire surface of the nonwoven webs 96, 98, both at the elastic films 84, 86 and in the non-elastic portion 114.

The apparatus according to the present invention may comprise a cutting unit configured for forming a longitudinal weakening line on the non-elastic portion 114, which forms a preferential breaking line which allows the two elastic parts of the elastic laminate 104 to be detached from each other following the application of a weak detaching force.

Figure 8:
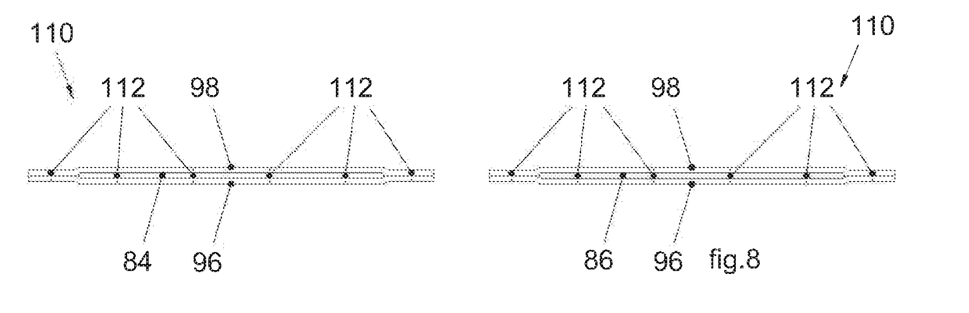

With reference to FIG. 8, the apparatus according to the present invention may produce two separate continuous elastic laminates 110, each comprising one continuous elastic film 84, 86 sandwiched between respective first and second narrow nonwoven webs 96, 98. The two continuous elastic laminates 110 of FIG. 8 may be produced by feeding on the anvil wheel two separate first narrow nonwoven webs 96 and two separate second narrow nonwoven webs 98 which are overlapped to respective first and second continuous elastic films 84, 86.

In the embodiments of FIGS. 7 and 8 the first and second continuous elastic films 84, 86 may have the same or different widths, they may be transversally stretched by equal or different stretching rates W2/W1, and they may be made of the same or of different materials.

Figure 9:
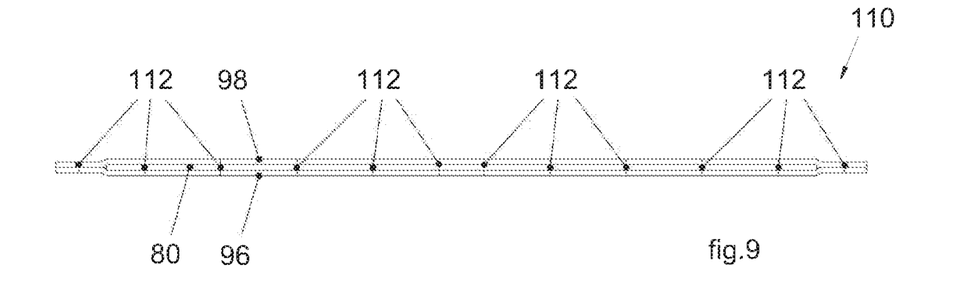

With reference to FIG. 9, the apparatus according to the present invention may also produce an elastic laminate 110 having a single wide continuous elastic film 80 sandwiched between first and second wide nonwoven webs 96, 98. The elastic laminate 110 of FIG. 9 may be produced by transversally stretching the single continuous elastic film 80 by the two second stretching members 18 of the stretching unit 10. The two first stretching members 16 of the stretching unit 10 may be disconnected from the sub-atmospheric pressure source and moved in the direction X away from the common transverse release line 72, so that they do not interfere with the single continuous elastic film 80.

Figure 10:
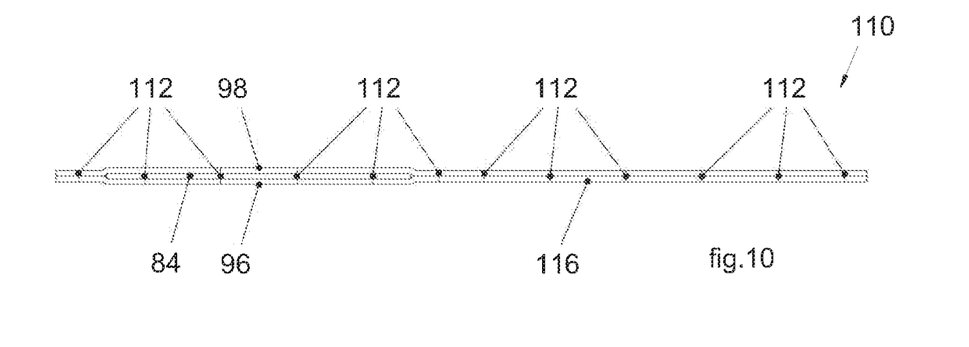

With reference to FIG. 10, the apparatus according to the present invention may also produce an elastic laminate 110 having only one continuous elastic film 84 sandwiched between first and second wide nonwoven webs 96, 98 which form a wide non-elastic portion 116 extending laterally to the continuous elastic film 84. The elastic laminate 110 of FIG. 10 may be produced by transversally stretching only one continuous elastic film 84 by the two stretching members 16, 18 of only one stretching device 12 of the stretching unit 10. The non-elastic portion 116 may extend on the left or on the right of the continuous elastic film 84. In a possible embodiment the single continuous elastic film 84 may be enclosed centrally between two wide nonwoven webs 96, 98 which form wide non-elastic portions 116 extending laterally from opposite sides of the single continuous elastic film 84. In a possible embodiment a single continuous elastic film 84 may be enclosed laterally between a wide nonwoven web and a narrow nonwoven web.

A wide nonwoven web 96, 98 has a width greater than the width of the first and second continuous elastic films 84, 86 set side by side, and a narrow nonwoven web 96, 98 has a width lower than the width of a wide nonwoven web 96, 98 and greater than the width of one continuous elastic films 84, 86.

The apparatus may comprise one or two winding units configured for winding one or two elastic laminates 110 in one or two reels.

Of course, without prejudice to the principle of the invention, the details of construction and the embodiments can be widely varied with respect to those described and illustrated, without thereby departing from the scope of the invention as defined by the claims that follow.

The invention claimed is:

1. A stretching unit for transversely stretching elastic films, comprising:
    first and second stretching devices each comprising first and second stretching members having respective outer edges provided with gripping elements configured for gripping corresponding edges of elastic films,
    wherein said first and second stretching members have respective first and second axes of rotation inclined with respect to each other,
    wherein said first and second stretching devices have respective gripping zones and respective release zones, and wherein the release zones of the first and second stretching devices are aligned to each other along a common transverse release line,
    wherein the first and second stretching devices are arranged on opposite sides of a central plane orthogonal to said common transverse release line,
    wherein each of said first and second stretching devices comprises a respective driving assembly configured for driving the respective first and second stretching members in rotation about the respective first and second axes of rotation,
    wherein the driving assembly of each of said first and second stretching devices extends on only one side with respect to said central plane, and
    wherein the driving assembly of each of said first and second stretching devices comprises first and second motors connected to the respective first and second stretching members at the respective first and second axes of rotation inclined with respect to each other.

2. The stretching unit of claim 1, wherein the driving assembly of the first stretching device and the driving assembly of the second stretching device are arranged on opposite sides of said central plane.

3. The stretching unit of claim 1, wherein said first and second stretching members of each of said first and second stretching devices comprise a plurality of suction holes pneumatically connected to respective stationary suction chambers, and wherein the stationary suction chambers of each of said first and second stretching devices are arranged on a same side with respect to said central plane.

4. The stretching unit of claim 3, wherein the stationary suction chambers of each of said first and second stretching devices are coaxial to the respective first and second stretching members.

5. The stretching unit of claim 3, wherein the stationary suction chambers of said first and second stretching devices connected to the first and second stretching members, which are distal with respect to the respective driving assembly, are selectively connectable and disconnectable from a sub-atmospheric pressure source.

6. The stretching unit of claim 3, wherein the stationary suction chambers of the first stretching device and the stationary suction chambers of the second stretching device are arranged on opposite sides of said central plane.

7. The stretching unit of claim 1, wherein each of said first and second stretching devices comprises first and second adjustment mechanisms configured for adjusting an inclination angle of the first and second axes of rotation of the respective first and second stretching members, and
    wherein the first and second adjustment mechanisms of each of said first and second stretching devices are arranged on a same side with respect to said central plane.

8. The stretching unit of claim 7, wherein said first and second adjustment mechanisms of the first stretching device and the first and second adjustment mechanisms of the second stretching device are arranged on opposite sides of said central plane.

9. The stretching unit of claim 1, wherein said first and second stretching members of each of said first and second stretching devices are spaced from each other in a transverse direction by a first distance in the gripping zone and by a second distance greater than said first distance in the release zone, and
    wherein said first distance and/or said second distance of the first stretching device is/are different from said first distance and/or said second distance of said second stretching device.

10. The stretching unit of claim 1, wherein in each of said first and second stretching devices, said first and second stretching members are respectively distal and proximal with respect to the respective driving assembly, and
    wherein the first stretching members of said first and second stretching devices face opposite sides of said central plane.

11. The stretching unit of claim 1, wherein each of said first and second stretching members is disk shaped.

12. A machine for manufacturing an elastic laminate or for manufacturing sanitary articles including at least one elastic laminate, comprising a stretching unit according to claim 1.

* * * * *

UNITED STATES PATENT AND TRADEMARK OFFICE
CERTIFICATE OF CORRECTION

| | |
|---|---|
| PATENT NO. | : 12,036,721 B2 |
| APPLICATION NO. | : 17/879828 |
| DATED | : July 16, 2024 |
| INVENTOR(S) | : Gabriele Sablone and Antonio D'Alberto |

It is certified that error appears in the above-identified patent and that said Letters Patent is hereby corrected as shown below:

On the Title Page

Item (71) should be listed as:
- Fameccanica.Data S.p.A., San Giovanni Teatino (Chieti), ITALY -

Item (72) should be listed as:
- Gabriele SABLONE, San Giovanni Teatino (Chieti), ITALY
Antonio D'ALBERTO, San Giovanni Teatino (Chieti), ITALY -

Signed and Sealed this
Eighteenth Day of March, 2025

Coke Morgan Stewart
*Acting Director of the United States Patent and Trademark Office*